United States Patent

Hamma et al.

[11] Patent Number: 5,600,185
[45] Date of Patent: Feb. 4, 1997

[54] CROSS OVER DELAY APPARATUS

[76] Inventors: Nolen L. Hamma, 2036 Fillmore St., Davenport, Iowa 52802; Dwain C. May, 2508 Jersey Ridge Rd., Davenport, Iowa 52803

[21] Appl. No.: 195,241

[22] Filed: Feb. 14, 1994

Related U.S. Application Data

[63] Continuation of Ser. No. 738,387, Jul. 31, 1991, abandoned.

[51] Int. Cl.$^6$ .................................................. H01H 43/04
[52] U.S. Cl. ........................................ 307/10.1; 361/195
[58] Field of Search ................................ 307/9.1, 10.1, 307/10.6, 592, 141, 141.4; 361/195–198; 303/70; 377/2, 5; 477/21, 23, 184, 199, 209

[56] References Cited

U.S. PATENT DOCUMENTS

| Re. 32,474 | 8/1987 | Reid | 307/10.1 |
|---|---|---|---|
| 4,275,292 | 6/1981 | Corbi | 377/17 |
| 4,467,219 | 8/1984 | Reid | 307/10.1 |
| 4,596,215 | 6/1986 | Palesotti | 123/335 |
| 4,812,671 | 3/1989 | Furrow | 307/10.1 |
| 4,846,467 | 7/1989 | Rosson | 273/445 |
| 4,883,151 | 11/1989 | Tobler | 192/4 A |

*Primary Examiner*—Fritz Fleming
*Attorney, Agent, or Firm*—Brian J. Laurenzo; Kent A. Herink

[57] ABSTRACT

A device for controlling the release of a drag racer which is adapted for use in elapsed time starts as well as standard starts. The race crew inputs the opponent's established elapsed time and their own established elapsed time into the invention, as well as the standard timing-light/reaction-time delay. The device then calculates the handicap by which a faster car will be held and adds that time to the timing-light/reaction-time delay. This permits the driver to begin release timing from his opponent's Christmas tree lights. The driver may use his own Christmas tree if he wishes by setting the ET timers to zero, to equal values, or by setting the opponent's ET lower than his own.

47 Claims, 3 Drawing Sheets

CROSS OVER DELAY APPARATUS

This application is a continuation of application Ser. No. 07/738,387 filed Jul. 31, 1991, now abandoned.

TECHNICAL FIELD

This invention relates generally to apparatus employed with vehicles commonly known as "drag racers." More specifically, this invention relates to timing apparatus employed to control the release of a drag race vehicle from a standing position at the start of what is commonly known as a "drag race."

BACKGROUND ART

Drag racing is a very popular type of motor vehicle racing sanctioned by the National Hot Rod Association (NHRA) and several other organizations. Commonly two vehicles race at a time, each attempting to be the first to cross the finish line one quarter mile away. Starts are controlled by a pole, known as the "Christmas tree," which is disposed at the starting line between the two vehicles and which displays in a vertical arrangement a series of light pairs. From top to bottom there are several, typically three, yellow light pairs, followed by a green light pair and then a red light pair. The lights of each pair disposed to opposite sides of the pole such that each vehicle has a set of three yellow, one green and one red light which pertains to its start. The yellow lights alert the drivers that the race is about to start; the green lights signal that the drivers may release the vehicles; and a red light flashes if a driver fouls by releasing his vehicle prior to his green light.

Although drag racing involves competitions between vehicles which have been placed within a particular class due to factors such as engine size, a very popular form of drag racing, known as "ET" or "elapsed time" racing, has developed whereby cars of different classes race each other, the more powerful car being held for a longer time at the starting line. More specifically each drag racing vehicle does a number of individual time trail runs to establish a typical ET for the track. When two vehicles race, the track delays the display of the tree lights for the faster vehicle by an amount equal to the difference between the two vehicles' established ETs.

A common practice in drag racing is to run the engine up to a high engine speed, while simultaneously locking the car against forward motion. Locking is achieved by electronic apparatus which either causes the vehicles' brakes to be engaged or which causes reverse gear to be applied within the transmissions simultaneously with a forward gear, these latter devices being known as transmission brakes or trans brakes. The driver achieves a rapid start by causing the locking device to disengage at an appropriate time.

To maximize the likelihood of releasing the vehicle at the earliest possible moment, ideally at the same instant as the green light comes on, electrical apparatus known as delay boxes have been developed for controlling the release of the locking mechanisms. The driver selects a yellow light at which he displays the most consistent reflexes, then selects a delay time which represents the time from that light to green. The driver then releases the locking device control button at the optimum time for the driver, and the delay box then releases the vehicle after the selected time has elapsed. To date no such device has been developed which satisfactorily addresses what has become the most popular form of drag racing.

DISCLOSURE OF THE INVENTION

This invention permits a driver to react to the first yellow light of the Christmas tree regardless of whether the race is handicapped or not. The race crew inputs the opponent's established elapsed time and their own established elapsed time into the invention, as well as the standard timing-light/reaction-time delay used by the driver. The device then calculates the handicap by which a faster car will be held and adds that time to the timing-light/reaction-time delay. This permits the driver to begin release timing from his opponent's Christmas tree lights. The driver may of course use his own Christmas tree if he wishes by setting the ET timers to zero, to equal values, or by setting the opponent's ET lower than his own.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figure 1:
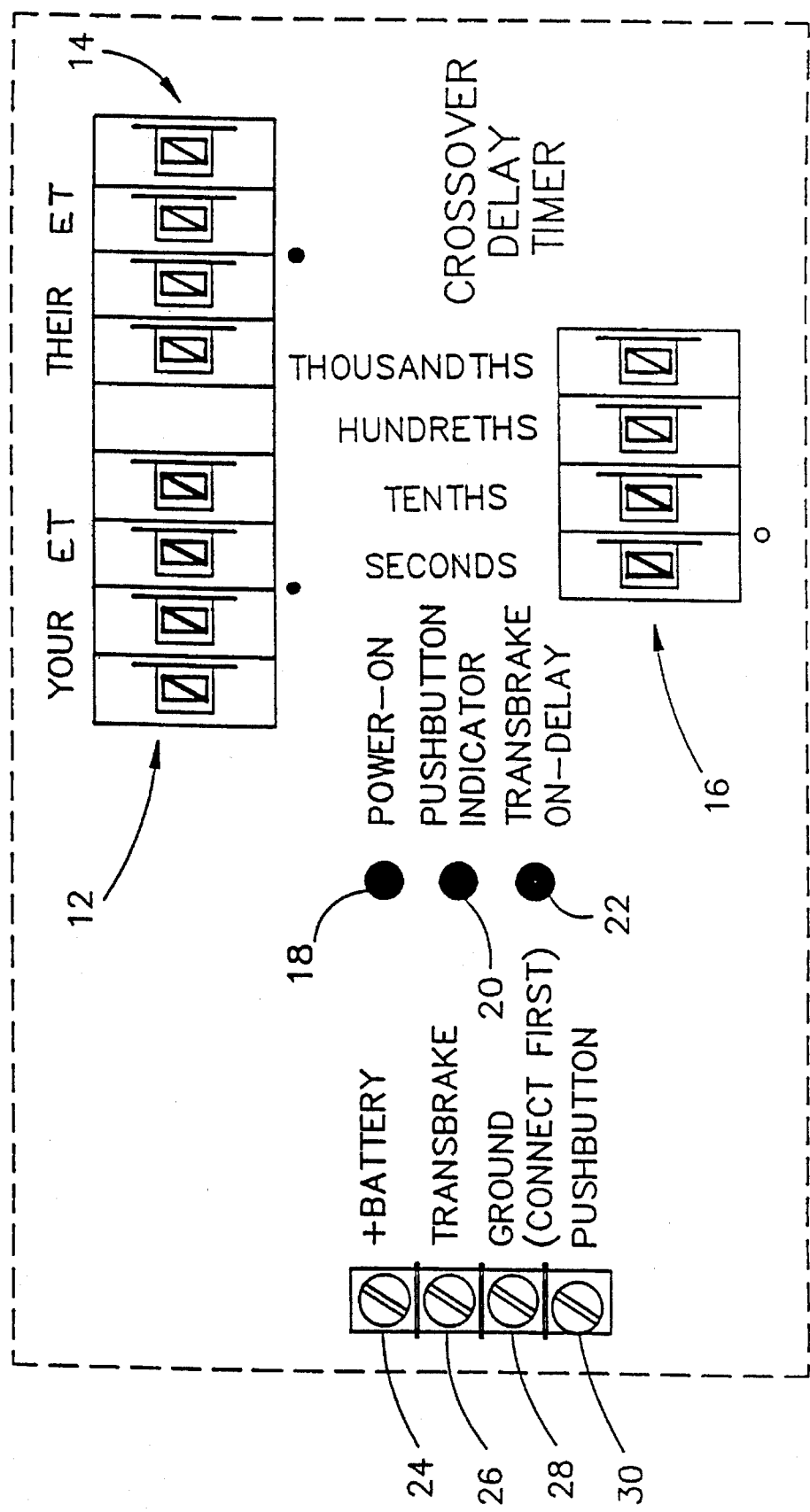
FIG. 1 depicts the front cover of the invention showing electrical connections, indicator lights, and timer set wheels.

Referring now to the drawings, wherein like reference numerals designate identical or corresponding parts throughout the several views, the front cover of the invention is shown in FIG. 1. Three separate rotary thumbwheel switches 12, 14, 16 are depicted. The "Your ET" thumbwheels 12 provide input of the driver's own established ET from 00.00 to 99.99 seconds. Likewise, the "Their ET" thumbwheels 14 provide input of the opponent's established ET in similar units. The third set of thumbwheels 16 provide entry of the delay time, typically 1.5 seconds minus the driver's reaction time, race car reaction time and roll-out time. This delay time is entered to one thousandth of a second.

Three indicator lights are also shown in FIG. 1. A red "Power On" light 18 is illuminated steady when the unit is receiving power. If the unit senses a low voltage on the transmission brake line (trans-brake line), the red power-on light 18 will flash. If the unit detects a short circuit in the trans-brake line, the red power-on light 18 will extinguish. These warning signals will occur after the trans-brake control switch 30 is depressed, at which time a high current is sent through the trans-brake line to engage the trans-brake. The yellow "Pushbutton Indicator" light 20 will illuminate when the trans-brake control switch 30 is depressed. Finally, the green "Transbrake On-Delay" light 22 will illuminate when the trans-brake is engaged.

Four electrical connectors are also depicted in FIG. 1. The "Battery" connector 24 provides for a power input from the vehicle battery of 12 volts. This line is fitted with an on-off switch for applying power to the device. The "Transbrake" connector 26 provides power to the trans-brake locking mechanism. The "Ground" connector 28 is connected to the vehicle chassis. The "Pushbutton" connector 30 provides for activation of the device through the trans-brake control switch 30 which may be attached to the steering wheel of the vehicle for easy access by the driver.

Figure 2:
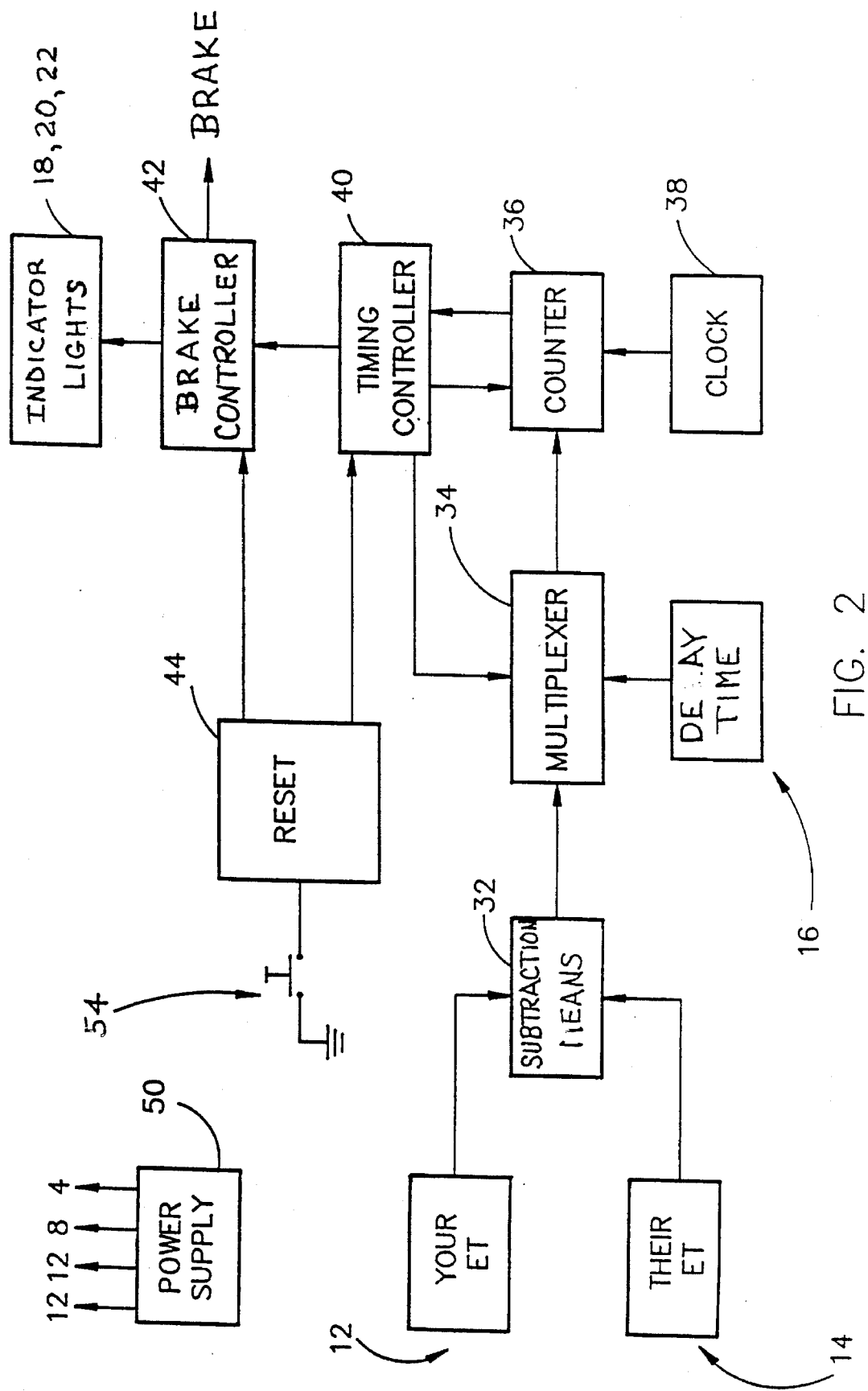
FIG. 2 is a block diagram of the invention.

FIG. 2 depicts a block diagram of the major components of the invention. Electrical power to the invention is provided by means of the vehicle battery and is controlled by a power switch. Power enters the power supply 50 where it is filtered and regulated to provide twelve volt, eight volt, and four volt outputs for the various components of the system. An unfiltered twelve volts is also sent to a trans-brake controller 42 which controls the power output to the trans-brake.

As described previously, the opponent's and the driver's previously established ET's are entered into the device by means of four bit BCD counters 12 and 14. These values are then sent to adder/subtracting means 32 which calculate the difference between the two ET's and send the result to a multiplexer 34 for subsequent transfer to a programmable counter 36. The driver's desired delay time is also entered into a four bit BCD counter 16 and sent to the multiplexer 34 for subsequent transfer to the counter 36. The counter 36 counts in response to clock pulses provided by the clock 38. The trans-brake control switch 30 functions to provide a lock signal to the transbrake mechanism. This occurs by means of the transbrake controller 42, which allows a high current flow to the transbrake thereby locking it. The trans-brake control switch 30 also enables the timing controller 40 which loads ET and delay times into the counter 36. When the trans-brake control switch 30 is released, counting begins. When the count is ended, the counter 36 sends a signal to the transbrake controller 42 to shut off power to the transbrake, and the transbrake is released. A reset circuit 44 causes the timing controller 40 to reset the counter 36 to the original values if the transbrake control switch 30 is released and then redepressed quickly before the transbrake has been disengaged. This is in case the driver happens to inadvertently release the transbrake control switch 30.

The adder/subtracting means 32 for the input ET's is designed to recognize when either the input ET's are zero, or when the opponent's ET is lower than the driver's ET. In either situation, no ET delay information will be used by the counter. That is, only driver delay information will be processed. This would be the situation when the race is not handicapped, or when the driver has the slower car, and will therefore be using his own side of the Christmas tree. If the driver wishes to utilize only the green light on the Christmas tree, he simply enters zero in all of the counters. The transbrake will then disengage immediately upon release of the trans-brake control switch 30.

Figure 3:
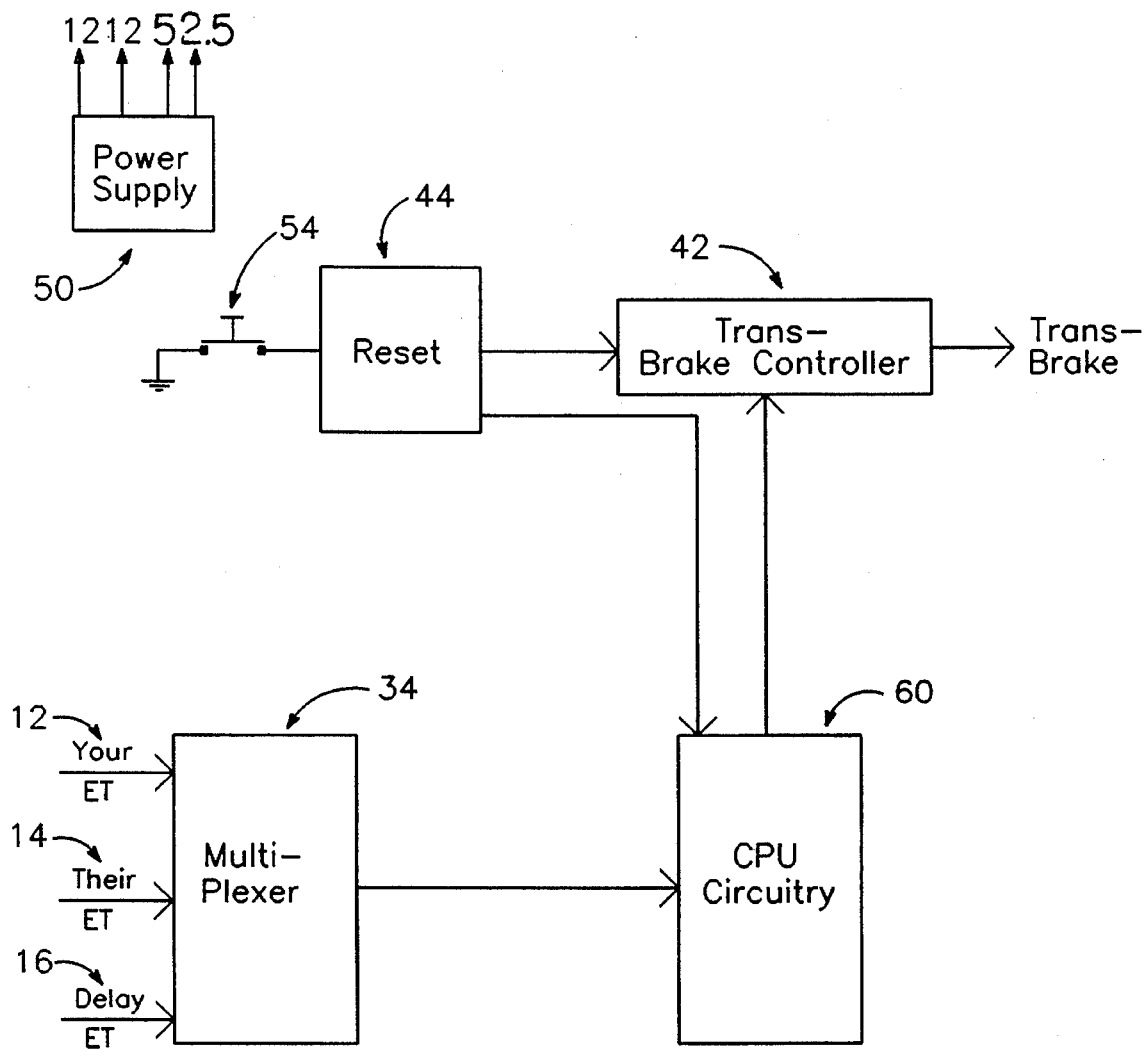
FIG. 3 is a block diagram of an anticipated embodiment of the invention in which CPU circuitry is incorporated.

It is anticipated that an alternative embodiment of the present invention incorporate CPU (central processing unit) circuitry to perform the functions of the discreet units such as adder/subtracting means 32, counter 36, clock 38, and timing controller 40. As shown in newly added FIG. 3, a value corresponding to Your ET 12 (or driver's ET) is received by a multiplexer 34 along with values corresponding to Their ET 14 (or opponent's ET) and the delay time 16. Thereafter, the multiplexer 34 sends this received information to CPU circuitry 60 which performs the functions of the subtraction means 32, counter 36, clock 38, and timing controller 40, and outputs a disengage signal, after a total delay time (equal to the sum of the handicap time and the delay time 16, where the handicap time is the difference between Your ET 12 and Their ET 14) after the opening of a trans-brake control switch 30, to the transbrake controller 42 which releases the trans-brake.

A further embodiment of this invention would utilize only a single thumbwheel switch to input the elapsed time difference between the two race vehicles rather than the pair of thumbwheels and the binary adder taught in the preferred embodiment.

Obviously, many modifications and variations of the present invention are possible in light of the above teachings. It is therefore to be understood that, within the scope of the appended claims, the invention may be practiced otherwise than as specifically described.

We claim:

1. An electrical device for use in a race vehicle for inputting a selectable delay period from the actuation of a control switch to the disengagement of vehicle braking means, comprising:

(a) brake control means for selectively engaging and disengaging the vehicle braking means;

(b) clock means for producing electrical clock pulses;

(c) means for counting a preselected first and second number of said clock pulses corresponding to said selectable delay period and outputting a signal to said brake control means in response thereto thereby disengaging said vehicle braking means;

(d) first means for selecting said first number of clock pulses to be counted by said counting means;

(e) a second input means for selecting a first value;

(f) a third input means for selecting a second value;

(g) means for subtracting said first value from said second value to obtain said second number of clock pulses to be counted by said counting means; and (h) means for actuating said counting means in response to the actuation of said control switch.

2. The electrical device as recited in claim 1, further comprising means for resetting the device if the counting means is inadvertently actuated.

3. The electrical device as recited in claim 1 further comprising means for indicating a low voltage condition in said brake control means.

4. The electrical device as recited in claim 1 further comprising means for indicating a short circuit condition in said brake control means.

5. The electrical device as recited in claim 1 further comprising means for indicating engagement of the vehicle braking means.

6. The electrical device as recited in claim 1 further comprising means for indicating actuation of the control switch.

7. A device for use in a race vehicle for effectuating a total time delay, equal to the sum of a delay time and a handicap time, between the opening of a control switch and the release of an electrically actuated brake, comprising:

(a) a brake controller for selectively engaging and disengaging said brake;

(b) means for providing a series of electrical clock pulses;

(c) means for selecting a first number of clock pulses to be counted, said first number corresponding to a delay time;

(d) means for selecting a second number of clock pulses to be counted, said second number corresponding to a handicap time;

(e) means for counting all of said first number of clock pulses and all of said second number of clock pulses and outputting a disengage signal to said brake controller when said counting is completed; and (f) means for actuating said means for counting in response to the opening of said control switch.

8. The device according to claim 7, wherein said means for selecting a second number of clock pulses to be counted comprises:

(a) means for receiving a first value and means for receiving a second value; and (b) means for mathematically combining said first value with said second value thereby providing said second number of clock pulses to be counted.

9. The device according to claim 7, further comprising means for resetting said counting means if said control switch is inadvertently opened.

10. The device according to claim 7, further comprising means for indicating a low voltage condition in said brake controller.

11. The device according to claim 7, further comprising means for indicating a short circuit condition in said brake controller.

12. The device according to claim 7, further comprising means for indicating engagement of said brake.

13. The device according to claim 7, further comprising means for indicating the opening of said control switch.

14. The device according to claim 7, wherein said means for providing a series of electrical clock pulses comprises a clock.

15. The device according to claim 7, wherein said means for counting all of said first number of clock pulses and all of said second number of clock pulses comprises:
  (a) a counter connected to a timing controller, said counter in communication with said timing controller;
  (b) a clock connected to said counter, said clock in communication with said counter;
  (c) a multiplexer connected to said counter, said multiplexer in communication with said counter; and
  (d) a timing controller connected to said counter and said multiplexer, said timing controller in communication with said counter and said multiplexer.

16. The device according to claim 15, wherein said multiplexer is capable of receiving said first number of clock pulses to be counted and said second number of clock pulses to be counted, wherein said timing controller is capable of signaling said multiplexer to communicate said first number of clock pulses to be counted to said counter, wherein said counter is capable of counting said first number of clock pulses while receiving clock pulses from said clock, wherein said counter is capable of signaling said timing controller that said first number of clock pulses have been counted, wherein said timing controller is capable of signaling said multiplexer to communicate said second number to said counter after receiving said signal from said timing controller that said first number of clock pulses have been counted, wherein said counter is capable of counting said second number of clock pulses while receiving clock pulses from said clock; wherein said counter is capable of signaling said timing controller that said second number of clock pulses have been counted; and wherein said timing controller is capable of outputting said disengage signal to said brake controller to release said brake after receiving said signal from said timing controller that said second number of clock pulses have been counted.

17. The claim according to claim 7, wherein said means for counting comprises CPU circuitry.

18. A device for use in a race vehicle for delaying the release of an electrically actuated brake a selectable period of time after the opening of a control switch, comprising:
  (a) a brake controller for selectively engaging and disengaging said brake;
  (b) means for receiving a delay time;
  (c) means for receiving a handicap time;
  (d) means for counting a total time delay equal to the sum of said delay time and said handicap time and outputting a disengage signal to said brake controller after said counting is completed; and
  (e) means for actuating said counting means in response to the opening of said control switch.

19. The device according to claim 18, wherein said means for receiving a handicap time comprises:
  (a) means for receiving a first value and means for receiving a second value; and
  (b) means for mathematically combining said first value with said second value thereby providing said handicap time.

20. The device according to claim 18, further comprising means for resetting said counting means if said control switch is inadvertently opened.

21. The device according to claim 18, further comprising means for indicating a low voltage condition in said brake controller.

22. The device according to claim 18, further comprising means for indicating a short circuit condition in said brake controller.

23. The device according to claim 18, further comprising means for indicating engagement of said brake.

24. The device according to claim 18, further comprising means for indicating the opening of said control switch.

25. The device according to claim 18, wherein said means for counting a total time delay comprises;
  (a) a counter connected to a timing controller, said counter in communication with said timing controller;
  (b) a clock connected to said counter, said clock in communication with said counter;
  (c) a multiplexer connected to said counter, said multiplexer, in communication with said counter; and
  (d) a timing controller connected to said counter and said multiplexer, said timing controller in communication with said counter and said multiplexer.

26. The device according to claim 25, wherein said multiplexer is capable of receiving said handicap time and said delay time, wherein said timing controller is capable of signaling said multiplexer to communicate said handicap time to said counter, wherein said counter is capable of counting said handicap time while receiving clock pulses from said clock, wherein said counter is capable of signaling said timing controller that said handicap time has been counted, wherein said timing controller is capable of signaling said multiplexer to communicate said delay time to said counter after receiving said signal from said timing controller that said handicap time has been counted, wherein said counter is capable of counting said delay time while receiving clock pulses from said clock; wherein said counter is capable of signaling said timing controller that said delay time has been counted; and wherein said timing controller is capable of outputting said disengage signal to said brake controller to release said brake after receiving said signal from said timing controller that said delay time has been counted.

27. The claim according to claim 18, wherein said means for counting a total time delay comprises CPU circuitry.

28. A device for use in a race vehicle for effectuating a delay between the opening of a control switch and the release of an engaged brake comprising:
  (a) means for receiving a plurality of values;
  (b) non-selective means for mathematically combining at least two of said values to provide at least one number of clock pulses to be counted;
  (c) means for counting said number of clock pulses after said control switch is opened; and
  (d) means for releasing said engaged brake after counting all of said number of clock pulses.

29. The device according to claim 28, wherein said means for counting comprises:
  (a) a counter connected to a timing controller, said counter in communication with said timing controller;

(b) a clock connected to said counter, said clock in communication with said counter;

(c) a multiplexer connected to said counter, said multiplexer in communication with said counter; and (d) a timing controller connected to said counter and said multiplexer, said timing controller in communication with said counter and said multiplexer.

30. The device according to claim 29, wherein said multiplexer is capable of receiving said number of clock pulses to be counted, wherein said timing controller is capable of signaling said multiplexer to communicate said number of clock pulses to be counted to said counter, wherein said counter is capable of counting said number of clock pulses while receiving clock pulses from said clock, wherein said counter is capable of signaling said timing controller that said number of clock pulses has been counted and wherein said timing controller is capable of signaling said brake controller to release said brake after receiving said signal from said timing controller that said number of clock pulses has been counted.

31. The claim according to claim 28, wherein said means for counting comprises CPU circuitry.

32. The device according to claim 28, wherein said means for receiving a plurality of values comprises a plurality of rotary thumbwheel switches.

33. The device according to claim 28, wherein said non-selective means for mathematically combining at least two of said values to provide at least one number of clock pulses to be counted comprises subtraction means.

34. The device according to claim 28, further comprising means for resetting said means for counting if said control switch is opened prematurely.

35. The device according to claim 28, further comprising means for indicating engagement of said brake.

36. The device according to claim 28, further comprising means for indicating the opening of said control switch.

37. A device for use in a race vehicle for effectuating a delay between the opening of a control switch and the release of an engaged brake comprising:

(a) means for receiving a plurality of values;

(b) non-selective means for mathematically combining at least two of said values to provide at least one delay time; and (c) means for releasing said engaged brake after said control switch is opened and after said delay time is expired.

38. The device according to claim 37, wherein said means for releasing said engaged brake comprises;

(a) a counter connected to a timing controller, said counter in communication with said timing controller;

(b) a clock connected to said counter, said clock in communication with said counter;

(c) a multiplexer connected to said counter, said multiplexer in communication with said counter; and (d) a timing controller connected to said counter and said multiplexer, said timing controller in communication with said counter and said multiplexer.

39. The device according to claim 38, wherein said multiplexer is capable of receiving said delay time, wherein said timing controller is capable of signaling said multiplexer to communicate said delay time to said counter, wherein said counter is capable of counting said delay time while receiving clock pulses from said clock, wherein said counter is capable of signaling said timing controller that said delay time has been counted, and wherein said timing controller is capable of signaling said brake controller to release said brake after receiving said signal from said timing controller that said delay time has been counted.

40. The device according to claim 37, wherein said means for releasing said engaged brake comprises;

(a) CPU circuitry; and (b) a brake controller connected to said CPU circuitry, said CPU circuitry in communication with said brake controller, said brake controller in operable connection with said brake, said brake controller capable of releasing said engaged brake upon receipt of a disengage signal from said CPU circuitry.

41. A method of delaying a release of an engaged brake of a race vehicle, said method comprising;

(a) receiving a plurality of values;

(b) additively combining at least two of said values to produce at least one delay time to be counted;

(c) counting said delay time; and (d) releasing said engaged brake after counting said delay time.

42. The method according to claim 41, wherein the step of counting comprises;

(a) providing a counter connected to a timing controller, said counter in communication with said timing controller;

(b) providing a clock connected to said counter, said clock in communication with said counter;

(c) providing a multiplexer connected to said counter, said multiplexer in communication with said counter; and (d) providing a timing controller connected to said counter and said multiplexer, said timing controller in communication with said counter and said multiplexer.

43. The method according to claim 42, wherein said multiplexer is capable of receiving said delay time to be counted, wherein said timing controller is capable of signaling said multiplexer to communicate said delay time to said counter, wherein said counter is capable of counting said delay time while receiving clock pulses from said clock, wherein said counter is capable of signaling said timing controller that said delay time has been counted, and wherein said timing controller is capable of signaling said brake controller to release said brake after receiving said signal from said timing controller that said delay time has been counted.

44. The method according to claim 41, wherein the step of counting said delay time comprises providing CPU circuitry.

45. The method according to claim 41, wherein the step of releasing said engaged brake comprises providing a brake controller connected to CPU circuitry, said CPU circuitry in communication with said brake controller, said brake controller in operable connection with said brake, said brake controller capable of releasing said engaged brake upon receipt of a disengage signal from said CPU circuitry.

46. The method according to claim 41, wherein the step of counting said delay time is initiated after the opening of a control switch.

47. The method according to claim 41, wherein the step of receiving a plurality of values includes providing a plurality of rotary thumbwheel switches.

* * * * *

UNITED STATES PATENT AND TRADEMARK OFFICE
CERTIFICATE OF CORRECTION

PATENT NO : 5,600,185
DATED : February 4, 1997
INVENTOR(S): Nolen L. Hamma and Dwain C. May It is certified that error appears in the above-identified patent and that said Letters Patent are hereby corrected as shown below:

Column 3, line 1, change "30" to --54--.

Column 3, line 14, change "BCD counters" to --rotary thumbwheel switches--.

Column 3, line 19, change "BCD counter" to --rotary thumbwheel switch--.

Column 3, line 22, change "30" to --54--.

Column 3, line 26, change "30" to --54--.

Column 3, line 28, change "30" to --54--.

Column 3, line 33, change "30" to --54--.

Column 3, line 34, change "30" to --54--.

Column 3, line 45, change "30" to --54--.

Signed and Sealed this

Thirtieth Day of December, 1997

Attest:

BRUCE LEHMAN

*Attesting Officer*   *Commissioner of Patents and Trademarks*